United States Patent Office 3,021,626
Patented Feb. 20, 1962

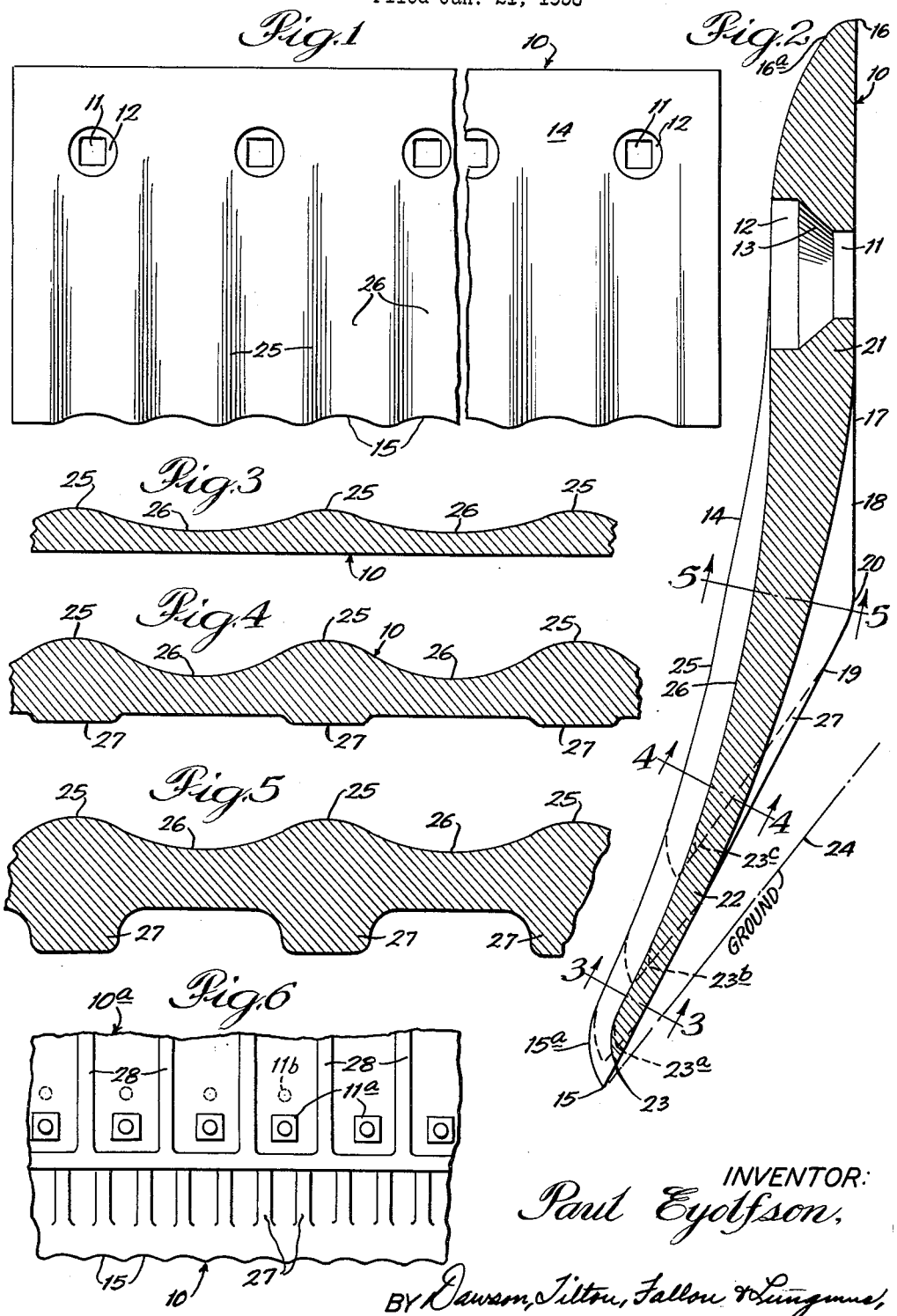

3,021,626
SCRAPER BLADE
Paul Eyolfson, Vancouver, Wash., assignor to Esco Corporation, a corporation of Oregon
Filed Jan. 21, 1958, Ser. No. 710,272
3 Claims. (Cl. 37—141)

This invention relates to a scraper blade which has special utility as part of earth-moving machinery used, for example, in the construction and maintenance of roads.

Scraper blades per se have been known and used for a long period. Although many innovations in blades for scrapers have been proposed, they have, for the most part, been unsuccessful in providing a long, effective working life. The achievement of both characteristics in a single structure has appeared to be nigh onto impossible. For long life, it seems that a blade should be simply but strongly constructed. For effectiveness, i.e., sharpness of the cutting edge and quick displacement of the scraped earth, something more than an ordinary knife edge is needed. Because of the apparent irreconcilability of the two demands, the scraper blades generally heretofore employed were simply constructed but with two scraping edges. Thus, reversal of the blade could double the wear life. However, blades of this character were essentially ineffective over most of their wear life, since their cutting ability diminished quickly and substantially after short use. It can be quickly appreciated that since both the bottom edge of the blade and the leading surface are subject to wear, the actual point of the edge tends to trail the leading surface. This is particularly undesirable where the blade is employed for the penetration of tough materials, a not infrequent use of a scraper blade.

It is a general object of this invention to provide a scraper blade that overcomes the problems and disadvantages outlined above. Another object is to provide a new and improved scraper blade that is characterized by having a long and effective operating life. Still another object is to provide a scraper blade which has but one longitudinal edge adapted for scraping, yet because of its arrangement and construction is of effectively a self-sharpening character so that its wearing life is equivalent to the heretofore double-edged blades. Yet another object is to provide a scraper blade that is generally arcuate in transverse cross section and in which the lower portion is tapered. A still further object is to provide a scraper blade of the character set forth in the object immediately preceding which is further provided with a forward or operational face equipped with spaced-apart, transversely-extending ridges to provide a generally corrugated appearance. Another object is to provide in a scraper blade of the character just described a scalloped or serrated longitudinal cutting edge provided by extending the tapered ridges slightly forward and beyond the longitudinal edge defined by portions of the blade intermediate the ridges. Still another object is to provide in a scraper blade having a tapered, generally arcuate cross-section and a corrugated front face, spaced reinforcing ribs on the rear face generally aligned with the ridges of the corrugations on the front face. Other objects and advantages of this invention can be seen as this specification proceeds.

This invention, in an illustrative embodiment, will be explained in conjunction with the accompanying drawing, in which—

FIG. 1 is a fragmentary top plan view of a scraper blade embodying teachings of this invention; FIG. 2 is an enlarged cross-sectional view (the section being a transverse cross-section) of the blade shown in FIG. 1; FIG. 3 is a fragmentary longitudinal sectional view taken along the line 3—3 of FIG. 2; FIG. 4 is a view similar to FIG. 3 but taken along the line 4—4 of FIG. 2; FIG. 5 is a view similar to FIGS. 3 and 4 but taken along line 5—5 of FIG. 2; and FIG. 6 is a fragmentary bottom plan view of the scraper blade mounted on a mold board.

In the illustration given, the numeral 10 (applied only to FIGS. 1, 2 and 6) designates generally a scraper blade. Scraper blades are conventionally elongated metal members of generally a rectangular appearance that are adapted to be secured to a moldboard designated generally 10a of a scraper or similar earth-moving machine. For this purpose, a plurality of longitudinally spaced-apart bolt-holes 11 are provided. Bolt-holes 11 may be provided with enlargements 12 (best seen in FIG. 2) and appropriately countersunk as at 13.

The blade illustrated herein, as can be best appreciated from a consideration of FIG. 2, is so constructed as to have generally an arcuate configuration in transverse section. This is particularly true of the front or load-engaging face 14, which is smoothly curved in a concave manner from the area about bolt-hole 11 down to almost the lower longitudinal edge 15. In FIG. 2, it is to be noted that bolt-holes 11 are located along a longitudinal line fairly close to the upper longitudinal edge 16 of blade 10. However, as will be brought out later, this is possible of variation for the achievement of other superior results.

In FIG. 2, it is to be noted that the front face 14 of blade 10 is reversely curved along the longitudinal edges thereof as at 15a and 16a, respectively, to provide a smooth load-engaging surface. The reverse curvature 15a present along the bottom portion of front face 14 additionally helps define the cutting or scraping edge 15.

The rear face 17 of blade 10 can be considered to be defined by two planes 18 and 19 intersecting in a line 20 that extends longitudinally of blade 10 and approximately along the longitudinal center line thereof. Plane 18 is so oriented with respect to front face 14 as to provide a generally thickened upper portion 21 in blade 10 that is supported by a moldboard (not shown) in FIG. 2 of a scraper or similar earth-moving vehicle. The lower plane 19 is so oriented with respect to the front face 14 as to develop a taper in the lower portion of blade 12, as can be seen at 22.

A blade 10 having a tapered lower portion 22 of the character just described permits the achievement of a long, effective operating life for a number of reasons. When it is considered that moldboards extend downwardly along the rear face of a blade to about the point designated 20, it is appreciated that the structure shown here permits the provision of more metal in the wearing area without excessive bulk. Although larger amounts of metal could be provided in conventional blades along the edge portions that extend below the moldboard, the immediate effect of such a modification would be to use more power for a given cutting operation because of the additional weight and also for supporting the additional weight of the entire blade which must be reinforced throughout correspondingly, particularly in the central portions where the blade is supported on the moldboard. Thus, to achieve an equivalent structure in a conventional blade, an intolerably heavy blade would result.

The presence of a larger amount of metal in the wearing area increases the service life of the blade, since more metal must be abraded in order to produce a given recession of the cutting edge. It has been found that blades constructed according to the teachings of this invention wear equally as long as conventional double-edged blades without the undesirable requirement of reversing the blade. For one thing, this eliminates the loss of operating time in order to turn the blade over. Where, however, the loss of operating time may be somewhat acceptable, the structure presented here achieves even more desirable results in that, with the addition of approximately 25% more metal along the top edge 16 of blade 10, I have found it possible to just about double the wear life of blade 10, which then would be equivalent to four times the life of one edge of a conventional double-edged blade. For this purpose, it is convenient to provide a second series of bolt-holes 11b so that the bolt-holes 11 shown would be positioned lower along the height of blade 10 than as shown in FIG. 2 and which was mentioned hereinbefore.

The use of a blade having a tapered arcuate cross-section provides a sharp cutting edge throughout the life of the blade which overcomes a distinct limitation in presently-employed blades. This can be appreciated from a consideration of FIG. 2, in which the initial configuration of the cutting edge is designated by the numeral 23, while the edges developed after wear are designated successively by the numerals 23a, 23b, and 23c. The orientation of blade 10 with respect to the ground to be leveled which is designated by the numeral 24, makes clear why the cutting edge of the blade 10 continues to remain sharp despite wear. Although wear in the blade structure pictured occurs along both the leading surface and the cutting edge, just as it does in conventional blades, the arrangement shown here maintains the actual point of the cutting edge out in front of the leading surface, which is essential for good penetration and easy loading of scraped earth.

The provision of a tapered section provides thin metal sections especially in the initial wearing areas. It is possible to employ more efficient heat treatment procedures with thinner sections so as to achieve superior microstructures insofar as strength, resilience, etc., is concerned, even with less highly alloyed steel. This could be especially important in times of national emergency where it is essential to save critical alloying elements and at the same time maintain optimum physical and toughness properties in the wearing metal.

Furthermore, by employing thin sections through the use of a tapered configuration in the wearing areas, a vexatious problem is avoided in the production of such blades which can manifest itself during the useful life of the blade with deleterious effects. The vexatious problem to which I refer is that of metal shrinkage. In the cooling of a metal structure, shrinkage occurs which tends to impose weakening stresses on the metal. Where the metal is of uniform thickness, the weakening stresses are uniformly distributed. Here, however, the areas in which strength is important, namely, the lower portions of the blade, are remote from the thick portions (i.e., 21), so that the undesirable weakening stresses are avoided. Such stresses, if present, are localized in thickened portions of the blade where they can be more easily absorbed and further in portions that are supported by the moldboard.

The arcuate nature of the blade, as seen in the cross-sectional view shown in FIG. 2, further contributes to the superiority of the blade during operation in that the gradual change in angle of the load-bearing face removes load-lifting stresses from the cutting edge. Very little lift stress is imposed upon the cutting edge, so that the wear thereof is produced primarily by cutting, and further, undue amounts of metal need not be concentrated at the cutting edge in order to resist the additional stress imposed by loads.

In the illustration given in the drawing, it is to be seen that the front face 14 is provided with a series of longitudinally-spaced, transversely-extending ridges 25. The ridges 25, when viewed from a longitudinal side of blade 10, give the top face 14 somewhat of a corrugated appearance, as can be most readily appreciated from FIGS. 3, 4 and 5. Comparison of FIGS. 3–5 shows that the ridges 25 decrease in height as they near the longitudinal lower edge 15. Also, as can be appreciated from FIG. 1, the ridges 25 project forwardly of the lower longitudinal edge 15, as might be considered defined by the portions 26 between ridges 25. This produces a scalloped or serrated cutting edge and thus increases the effective length of the cutting edge (as compared to a straight line), thereby reducing the "cutting" per lineal inch required to do the same job as a conventional straight-edged blade. This results in the reduction of power required and wear imposed. Further, the scalloped or serrated leading edge, in combination with the tapered arcuate lower portion of blade 10, provides an arrangement that maintains a flat cutting plane (see FIG. 2) while still providing a series of leading points for better penetration of tough materials. I am thus able to achieve the advantages of better penetration, longer effective cutting length, and longer life in a blade, through the use of "corrugations," without introducing furrows in the scraped area.

The rear face 17 of blade 10 is equipped with a plurality of reinforcing ribs 27 (best seen in FIG. 5), which are transversely disposed and aligned with ridges 25 on the front face 14 of blade 10. As can be appreciated from a comparison of FIGS. 3–5, ribs 27 terminate a spaced distance above the lower longitudinal edge 15 of blade 10. These ribs 27 coperate with the somewhat thicker portion of blade 10 in the area where the load-lifting stresses become strong. They further cooperate with the ribs 25 to reinforce them in the resisting of forces imposed by materials into which the leading edges of the ribs 25 penetrate.

Also, as seen in FIG. 6, the ribs 26 are aligned between ribs 28 provided in the underside of moldboard 10a which further reinforces the overall assembly. Nut and bolt assemblies 11a are employed between ribs 28 to receive the scraper blade 10 to the moldboard 10a.

While, in the foregoing specification, a detailed description of the invention has been given for the purpose of illustrating the invention, it will be understood that the details thereof may be varied widely by those skilled in the art without departing from the spirit of this invention.

I claim:
1. A scraper blade, comprising a unitary, elongated, generally rectangular metal body arcuate in transverse section to provide a generally concave front face and a generally convex rear face, said body having a lower longer edge providing a ground-cutting edge and an upper longer edge adapted to be secured to a moldboard, portions of the rear face of said body being defined by planes intersecting along a longitudinal line near the body longitudinal center line, said body being transversely tapered from about said center line toward said cutting edge, each face of said body being equipped with transversely-extending, rib-like projections aligned on opposite faces of said body and tapering toward each longitudinal edge, and means for securing said blade to a moldboard, said blade, when so secured, having the rear face portion adjacent said cutting edge disposed approximately parallel with the ground to maintain said cutting edge in sharpened condition, said rib-like projections providing a series of leading points for material penetration, said points all lying in the same plane.

2. The structure of claim 1 in which said securing means comprises two rows of bolt openings arranged parallel to said cutting edge.

3. A scraper blade, comprising a unitary generally rectangular body having two longer sides, one of said longer sides being adapted for use as a scraping edge, said body being arcuate in transverse section to provide a generally concave front face, said body having a rear face with portions thereof being defined by planes intersecting along a longitudinal line near the body longitudinal center line, said body being transversely tapered from about said center line toward said scraping edge, said body being equipped with a plurality of parallel, longitudinally spaced-apart, transversely-extending rib-like portions tapering toward said longer sides and extending forwardly from said front face, and means for securing said blade to a moldboard to position the said rear face portion adjacent the said scraping edge approximately parallel to the ground, whereby said scraping edge is adapted to be maintained in sharpened condition through contact with the ground, said securing means comprising bolt openings extending through said body spaced from said scraping edge and arranged in two rows parallel to said scraping edge, said rib-like portions being extended beyond said scraping edge to provide a series of leading points for material penetration, said points all lying in the same plane.

References Cited in the file of this patent

UNITED STATES PATENTS

| | | |
|---|---|---|
| 7,252 | Sweet | Apr. 2, 1850 |
| 1,419,524 | Seyms | June 13, 1922 |
| 1,503,866 | Washburn et al. | Aug. 5, 1924 |
| 1,633,057 | Wold | June 21, 1927 |
| 1,674,110 | Harden | June 19, 1928 |
| 1,712,853 | Taylor | May 14, 1929 |
| 1,765,218 | Erhart | June 17, 1930 |
| 1,807,998 | McCord | June 2, 1931 |
| 1,976,303 | Smitt | Oct. 9, 1934 |
| 1,989,776 | Weimer | Feb. 5, 1935 |
| 2,452,387 | Mossak | Oct. 26, 1948 |
| 2,471,164 | Mohl | May 24, 1949 |
| 2,494,225 | Blake | Jan. 10, 1950 |
| 2,683,942 | Whisler | July 20, 1954 |
| 2,887,797 | O'Connor | May 26, 1959 |